April 24, 1956 W. J. OPOCENSKY ET AL 2,742,801
BORING MACHINE
Filed Oct. 28, 1952 4 Sheets-Sheet 1

INVENTORS:
WILLARD J. OPOCENSKY,
HARLAN BUSETH, AND
BY CHARLES R. COLE.
ATTORNEY.

April 24, 1956  W. J. OPOCENSKY ET AL  2,742,801
BORING MACHINE
Filed Oct. 28, 1952  4 Sheets-Sheet 2
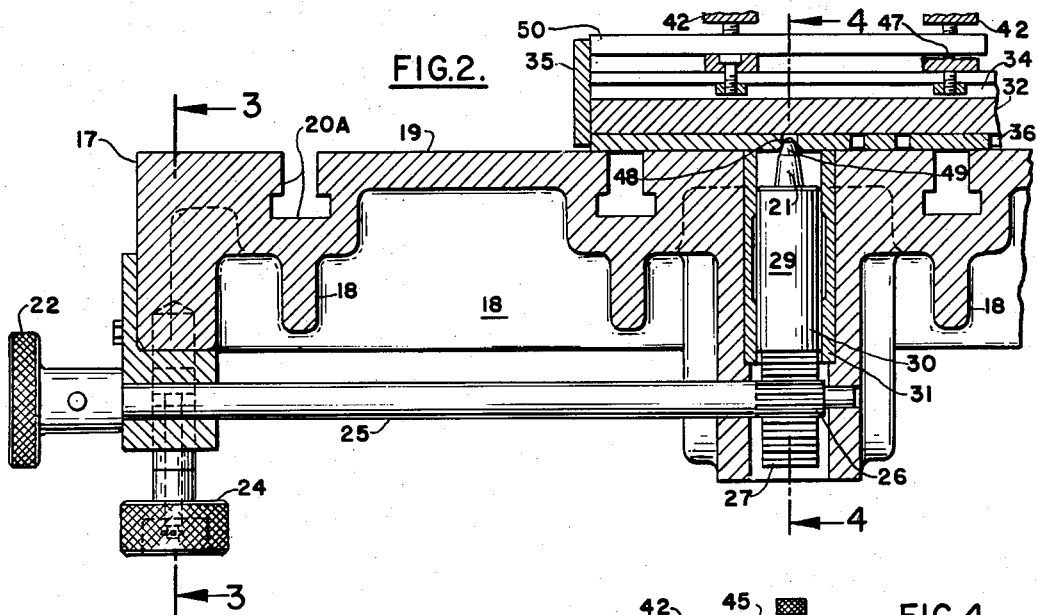
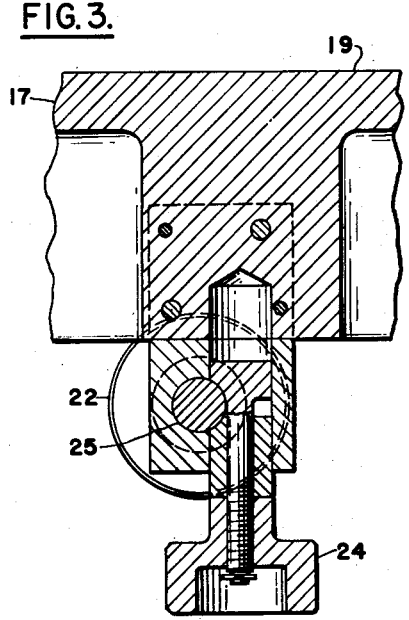
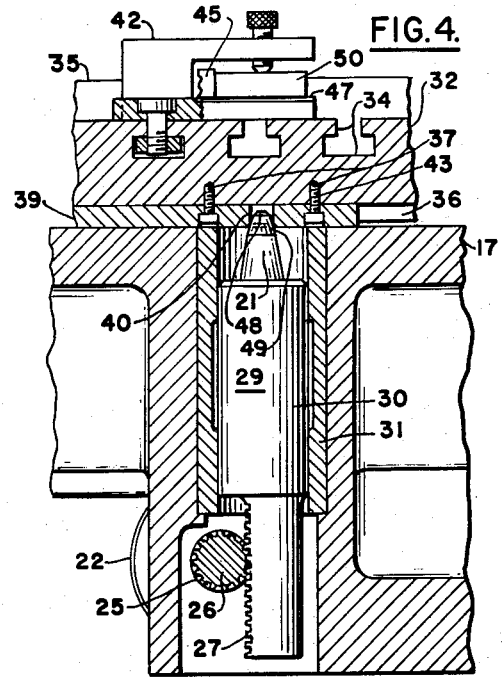
INVENTORS:
WILLARD J. OPOCENSKY,
HARLAN BUSETH, AND
BY  CHARLES R. COLE,
*F. Munro Redman*
ATTORNEY.

April 24, 1956 W. J. OPOCENSKY ET AL 2,742,801
BORING MACHINE
Filed Oct. 28, 1952 4 Sheets-Sheet 3
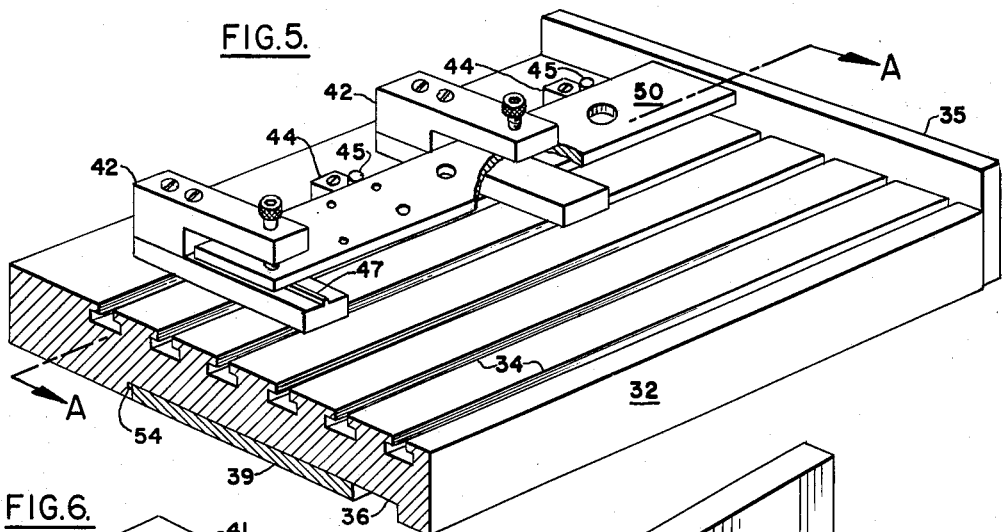
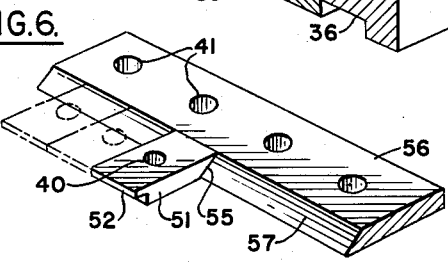
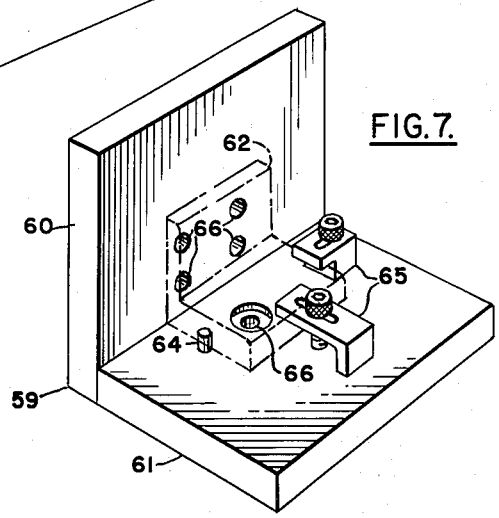
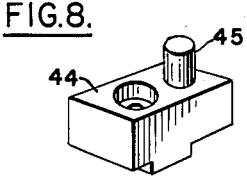
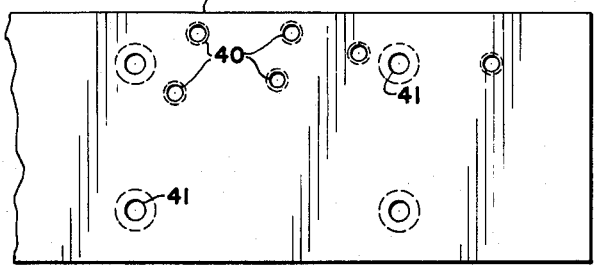
INVENTORS:
WILLARD J. OPOCENSKY,
HARLAN BUSETH, AND
BY CHARLES R. COLE.
ATTORNEY.

April 24, 1956 W. J. OPOCENSKY ET AL 2,742,801
BORING MACHINE
Filed Oct. 28, 1952 4 Sheets-Sheet 4

INVENTORS:
WILLARD J. OPOCENSKY,
HARLAN BUSETH, AND
BY CHARLES R. COLE.

ATTORNEY.

the drawings and description following, in which:

United States Patent Office 2,742,801
Patented Apr. 24, 1956

2,742,801

BORING MACHINE

Willard J. Opocensky, Glendale, and Harlan Buseth and Charles R. Cole, Burbank, Calif., assignors to Librascope, Incorporated, Glendale, Calif., a corporation of California Application October 28, 1952, Serial No. 317,308

1 Claim. (Cl. 77—63)

This invention relates to high precision machine tools, and particularly to improvements in jig borers and the like.

Jig borers were originally developed as tools of high accuracy for making jigs and fixtures to be used directly in the manufacture of items requiring a somewhat lesser degree of precision.

The versatility of the jig borer makes it also potentially valuable for the direct production of precision parts. For items to be produced in moderate volume, the expense and time of designing and building production jigs and fixtures may be substantially reduced by its use. The invention provides means for relatively positioning a work piece and a boring tool rapidly and accurately.

The jig borer of the present invention then becomes a valuable tool for the direct manufacture of intermediate and short run items where the boring of holes with great accuracy in diameter, location and alinement is required. It eliminates the expense of operator time required to obtain the proper relative positions where direct measurements cannot be made between the work piece and the cutting edge of the tool. This device permits the use of relatively unskilled labor to produce high precision work, with consequent savings in production cost. It also makes it unnecessary to check each work piece for the accuracy of location of holes, effecting a substantial saving in inspection costs.

The invention has been illustrated as incorporated in a floor-type jig borer having a stationary horizontal work table and vertical travel of the boring spindle. It is important that the spindle be perpendicular to the work table.

The illustrated embodiment of the invention comprises a retractable indexing or positioning member in the work table, accurately alined axially with the cutting tool, the axis of the latter being normal to the work table. The retractable member may be raised to engage a bore or recess in the underside of the work piece, or a fixture holding the work piece. By this means, work pieces may be accurately positioned, removed from the machine as often as necessary, and shifted to positions for other operations in a minimum of time, without requiring repeated measurements to locate the pieces properly.

Another feature of the invention is the arrangement for rapidly mounting, removing and replacing a boring bar without destroying the precise setting of the tool relative to a work piece.

The primary object of the invention is thus to provide a quicker and more accurate method of positioning work pieces in a high precision machine tool.

Another object is to provide for the rapid, accurate, location and relocation of work pieces and cutting implements in a machine tool without the necessity of repeated measurements.

A further object is to reduce the necessity for careful inspection of parts requiring precise spacings of a number of bores.

A still further object is to make it possible for relatively unskilled labor to turn out parts to precision tolerances.

These and other objects may be better understood from the drawings and description following, in which:

Fig. 1 is a perspective view of a jig-boring machine incorporating the invention.

Fig. 2 is a cross-sectional view taken in the direction indicated by line 2—2 in Fig. 1, but with an alternative work table construction. Fig. 2 shows details of the retractable positioning pin, and of a fixture adapted to hold a work piece. The fixture showing is sectional, taken as indicated by line A—A in Fig. 5.

Fig. 3 is a sectional view, taken as indicated by line 3—3 in Fig. 2, showing details of the means for controlling the retractable positioning pin.

Fig. 4 is a sectional view, taken as indicated by line 4—4 of Fig. 2 to show the details of the construction of the retractable positioning pin.

Fig. 5 is a perspective view of a work-holding fixture for use with the invention.

Fig. 6 is a fragmentary view in perspective of another portion of a fixture for use with the invention.

Fig. 7 is a perspective view of another work-holding fixture for use with the invention.

Fig. 8 is a perspective view of a different form of member associated with a fixture.

Fig. 9 is a top view of a template used with the work-holding fixture of Fig. 5.

Figure 1:
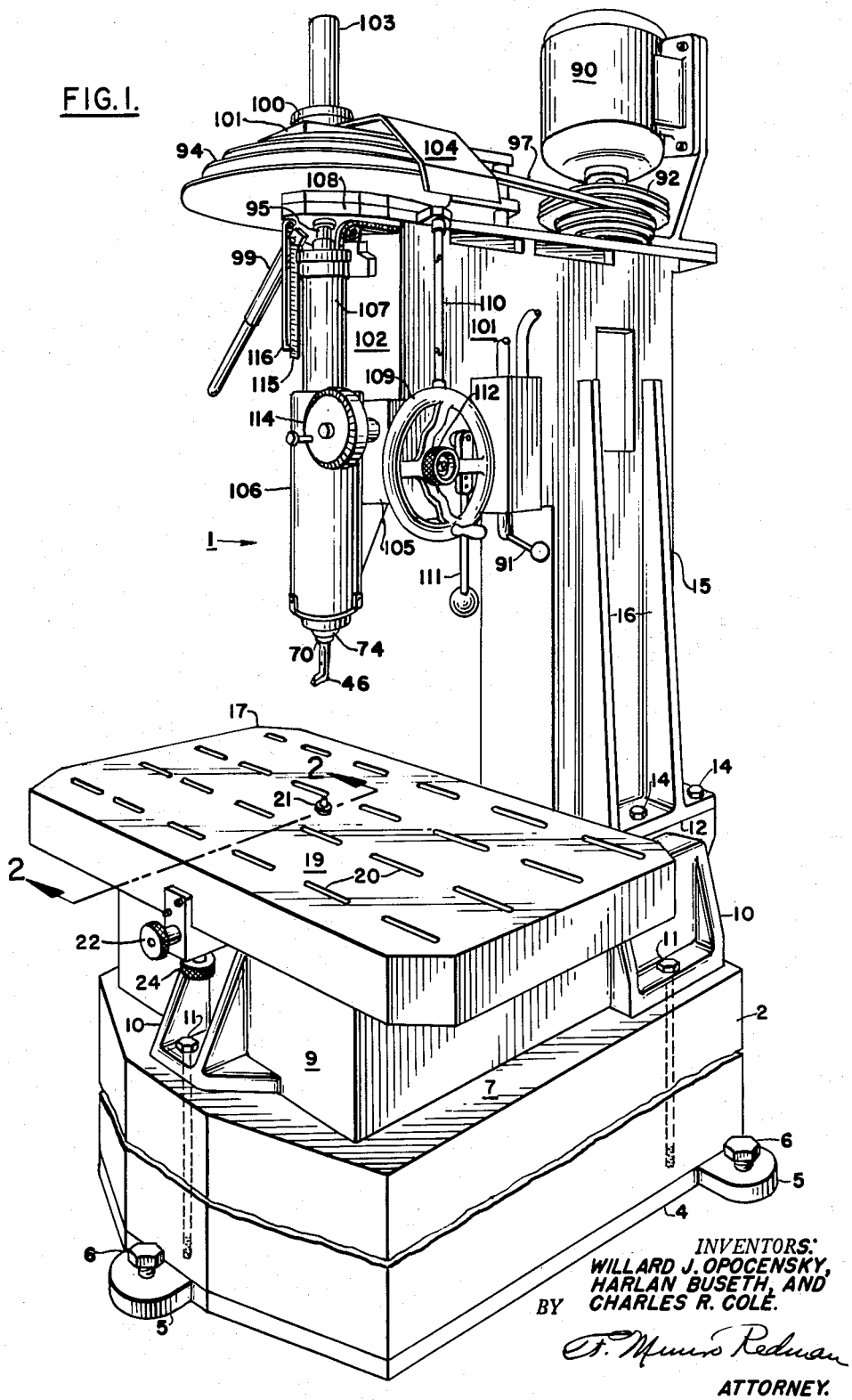

The invention has been shown as embodied in a vertical jig boring machine, indicated generally as 1. A heavy foundation block 2 is provided, to give adequate strength and provide sufficient mass to minimize vibration effects in the machine. The high inertia of block 2 prevents transmission of vibrations from adjacent equipment, and makes it unnecessary to bolt the machine to the floor. Foundation block 2, which may be of concrete, rests on a heavy steel foundation plate 4. Three ears 5 project from plate 4, and a conventional leveling screw 6 is threadably disposed thru each. These screws constitute a three-point support by means of which the upper surface 7 of foundation block 2 may be accurately leveled. Alternatively, if a relatively level base for block 2 is provided, shims may be placed between the block and the base to be mounted thereon in order to level the latter exactly. It will be obvious that a base of cast iron, steel or the like, might be used instead of the concrete block.

The upper surface 7 of the foundation block is made flat in order to receive a heavy base 9, which is designed for great rigidity. Base 9 has brackets 10 projecting therefrom which receive bolts 11 extending upwardly thru block 2 from the foundation plate 4. These bolts secure plate 4, block 2 and base 9 tightly together as a rigid unit.

At the rear of the base 9, a flat surface 12 is formed, parallel to the upper surface 7 of the foundation block. Mounting bolts 14 are used to fasten a vertical column 15 securely to base 9. Column 15 may be fabricated, as by welding heavy plate stock. A number of ribs 16 may be used to furnish the necessary rigidity. Column 15 may also be of cast or other equivalent construction, but in any case the material used must have a minimum of dimensional instability, and the device must be so arranged that the accuracy of alinement between the retractable locating pin and the boring tool, to be hereinafter described, is maintained in spite of temperature and load variations.

A motor 90 is mounted at the top of the vertical column 15. Switch handle 91 controls operation of the motor 90, which may conveniently be at either of two speeds. Additional flexibility in the operating speed is obtained by the use of a series of drive pulleys 92 of different sizes on the shaft of motor 90, and a complementarily graduated series of pulleys 94 fixed to the driven spindle 95. The proper combination of driving and driven pulleys may be conventionally selected by shifting the drive belt 97. A simple brake, actuated manually thru brake arm 99 is arranged to stop the rotating spindle quickly when desired, and is useful in holding it when inserting or removing collets.

Spindle 95 is journaled at its upper end in a precision bearing 100 fixed to the upper forward portion 101 of bracket arm 102, which extends forwardly from column 15. A spindle cap 103 encloses the upper end of spindle 95, while a shield 104 extends from a position adjacent bearing 100 over a portion of the driven pulleys 94 and belt 97 to protect the operator.

At the lower forward portion 105 of the bracket arm 102 is attached the quill housing 106. Within quill housing 106, the quill 107 is precisely mounted perpendicular to the work table 19 and carefully alined to be exactly centered axially above the indexing pin 21. Quill 107 is made long to provide adequate bearing spacings at all times. Pre-loaded ball bearings mounted within the quill, maintain a precise relation between the quill and the driven spindle 95, which rotates therein. The quill 107 is counter-balanced for ease in control, and may be raised or lowered by the handwheel 109. Positive feed is provided thru a universally jointed shaft 110 by spur gears, not shown, rotated by the drive spindle 95. This action is controlled by a feed control lever 111, which has neutral, up-feed and down-feed positions.

The operator may shift from manual control to power feed by tightening the locking knob 112. The vertical travel of the quill may then be observed by the rotational movements of the micrometer feed dial 114 for close measurements. Coarse settings of the quill are read on a vertical scale 115, secured to the quill 107, against the fixed index 116 carried by the lower arm 108 of the upper forward portion 101 of the bracket arm 102.

Within quill 107, well-spaced, pre-loaded ball bearings provide positioning support for the spindle 95. At the lower end of the quill, there is a tool-receiving portion 74 associated with spindle 95 for the attachment of the collet 70 or other tools.

Figure 10:
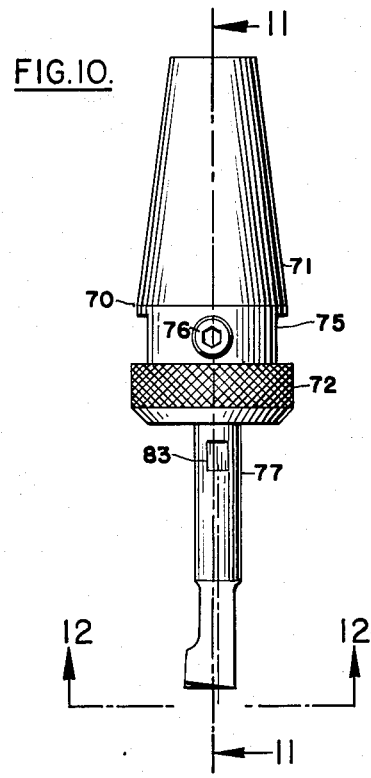
Fig. 10 is a view of an improved combination of boring bar and tapered collet for use in combination with the location means of the present invention.
Figure 11:
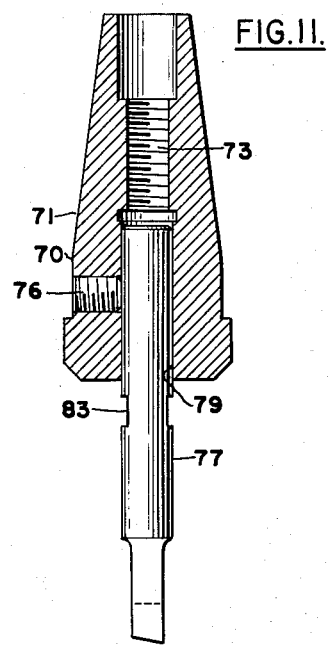
Fig. 11 is a sectional view, taken along the line 11—11 in Fig. 10, to show additional details of the improved boring bar and collet.
Figure 12:
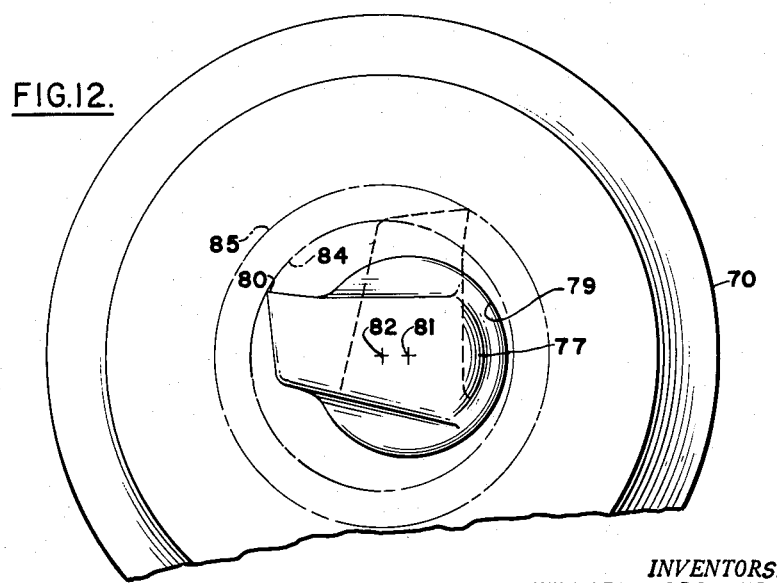
Fig. 12 is a bottom view, taken as indicated by line 12—12 in Fig. 10, to show the method of adjusting the diameter of the cut to be made by the boring bar.

A novel boring bar and removable collet, having particular utility in connection with the other features of the present invention, is shown in detail in Figs. 10 to 12. The collet 70 has a conventionally tapered shank 71, and a knurled portion 72 to assist in holding it. An internally threaded portion 73 is arranged to cooperate with a correspondingly threaded stud within a female taper in the lower end 74, not shown in detail, of the driven spindle 95, described hereafter. Thus the collet may be tightly secured in accurate alinement with the axis of rotation of the spindle, yet quickly removed, wrench flats 75 being provided on the collet for this purpose.

A conventional set screw 76 is provided for fixing the boring bar 77 in position in receiving bore 79 formed in the collet. The receiving bore 79, contrary to usual practice, is offset from the geometrical axis of collet 70. This allows the operator to rotate the boring bar 77 to make an exact adjustment of the diameter of the bore which the cutting edge 80 will produce. Since the rotational axis 81 of the boring bar is displaced from the axis 82 of the collet, it will be seen from Fig. 12 that rotating the bar with respect to the collet will cause the diameter of the resultant bore to vary. The boring bar is provided with wrench flats 83 so that it may be turned about its axis for this purpose. The results of two different diameter settings are indicated by the dot and dash circles 84 and 85. Customarily, the adjustment is continued until a test bore is produced of the proper diameter, at which point set screw 76 is tightened finally and the tool is ready for use.

It will now be possible to remove and replace the collet and boring bar as a unit as often as desired without disturbing the precise setting. A number of such units may be provided at low cost to give great flexibility in production operations.

Returning now to Fig. 1, the forward portion of the upper surface 12 of base 9 is arranged to receive a stationary work table 17, and is accurately finished to provide a support on which table 17 may be securely held in a horizontal plane.

The work table 17 is heavy and substantial, and provided with a number of reinforcing ribs such as those shown at 18 in Fig. 2 in order to give proper support for work pieces of varying sizes. The upper surface 19 is made flat to a high order of accuracy and a number of slots 20 are formed thru it to assist in relieving stresses and disposing of waste material. The slots 20 may be open, or may be T slots 20A as shown in Fig. 2.

Centrally of the work table 17, a retractable locating pin, indicated generally as 21, is disposed. The vertical travel of pin 21 is controlled by a positioning knob 22. Pin 21 may be fixed in position by a locking knob 24. Knobs 22 and 24 are located at the front of the table 17, conveniently close to the operator's hands.

The locating knob 22 controls the locating or indexing pin 21 thru shaft 25, which has a pinion 26 formed thereon, as seen in Figs. 2–4. Pinion 26 engages a rack 27 constituting the lower part of the locating pin assembly, indicated generally as 29. This assembly includes a precisely machined cylindrical guide section 30, which makes a close sliding fit with a long sleeve 31 fixed vertically in table 17.

Sleeve 31 affords sufficient lateral support for the locating pin 21, so that it may perform its proper function of drawing the work piece into the proper location on the work table when raised by the operator. If the work piece has suitable locating holes on its underside, it may be positioned with or without clamping, directly on work table surface 19; more frequently the work piece will be held on a fixture such as a heavy guide plate 32, shown in Figs. 2, 4 and 5. The guide plate 32 has its working surfaces made flat to a high degree of accuracy. It has a number of T slots 34 formed in its upper surface, and a precision ground positioning bar 35 is fixed on one end. The under side of guide plate 32 is recessed at 36, and a number of threaded holes 37 are provided in order to permit the ready attachment of templates 39 of various sizes and shapes.

Each template has a locating hole 40 formed in it for each hole to be bored in the work piece, as well as attachment holes 41. Screws 43 inserted thru the attachment holes 41 into screw holes 37 maintain the template in proper position beneath guide plate 32 to be engaged by the locating pin 21.

In preparing for the operations on a particular type of work piece, the operator fixes clamps 42 and positioning members 44 having precision-ground locating pins 45, as seen in Fig. 8, to the guide plate 32, usually by fastening means associated with the T slots 34. He then places the work piece in the clamps 42 snugly against the positioning bar 35 and ground locating pins 45, which spaces it accurately with relation to the template holes 40. The work piece may now be clamped securely in position, and guide plate 32 laid, with or without clamping, on the work table surface 19. Working from his prints, the operator moves the guide plate until the proper one of the locating bores 40 is somewhere near the axis of the locating pin 21. He then raises the pin, which engages the locating bore and draws the guide plate 32 toward the correct position for the operations of the boring tool 46. The engaging surface of clamps 42 may be flat, or ribbed as shown at 47.

To assist in alining the work piece, the entrance to each locating bore 40 is chamfered, as is the upper end 48 of the engaging portion 49 of locating pin 21. This permits the pin to enter the locating bore even when substantially off center. In addition, the engaging portion 49 is tapered. It has been found that a difference of three thousandths (.003) of an inch per inch in the diameter of the upper and lower ends of the tapered engaging portion 49 is sufficient taper to permit ready engagement with one of the template locating bores 40, and yet allow the operator to draw the plate 32 easily into the exact position for operating on the work piece 50 by simply raising pin 21. In this way, any number of holes may be bored in a work piece to high precision standards, without requiring repeated accurate measurements by the operator. The time and cost of production may thus be very substantially reduced.

Auxiliary fixtures designed to facilitate the use of the invention for operations on a variety of pieces are shown in Figs. 6 and 7. When provision is to be made for a plurality of evenly spaced holes to be drilled in line, it may be advantageous to use a number of templates of uniform size. Such an indexing template is illustrated at 51 in Fig. 6. A projecting tongue 52 is arranged to fit into a locking groove 54, seen in Fig. 5, formed at the edge of recess 36 on the underside of guide plate 32. The indexing template 51 is accurately ground to a standard size, as .5000 of an inch in length measured parallel to tongue 52, and has the locating bore 40 centered properly.

Opposite tongue 52, an inclined face 55 is formed on the template 51. A locking strip 56, having a complementarily inclined face 57, is arranged to be secured in recess 36 thru attachment holes 41 similar to those used with template 39.

As many as desired of the standard templates 51 may be lined up with their tongues 52 inserted in groove 54. The locking strip 56 is then tightened to plate 32, and the wedging action of the inclined faces 55 and 57 will ensure that templates 51 have a highly accurate spacing relative to plate 32.

Another fixture of special advantage with work pieces formed with a right angle, and in which holes must be bored normal to certain others, is shown in Fig. 7. The fixture 59 may be constructed of two plates 60 and 61 secured together to define accurately a right-angled seat, in which a work piece such as that shown in dotted lines at 62 may be received against a precision-ground locating pin 64, and held in place by clamps 65. In this fixture the locating bores 66 may be conveniently formed in the plates 60 and 61 prior to assembly in the completed fixture. The advantage of this type of fixture is that the single positioning and clamping operation on the work piece makes possible a plurality of operations in two planes without additional measurements.

It will be seen from the above description that the invention provides improved means for production jig boring which will result in substantial savings in time and money. The principles may also be applied to other types of equipment in which it is necessary to locate parts accurately for drilling boring, counterboring, reaming and other machining operations.

We claim:

In a machine tool of the character described having a rotatably mounted spindle adjustably supported for movement along a vertical axis; the combination of means for positioning a template attached to a work piece in a plane normal to the axis of said spindle while permitting free movement of said template in all directions in said plane comprising a work table having an upper surface every portion of which lies in a plane normal to the axis of said spindle and which is unobstructed throughout its entire area; and selectively operable means for constraining said template against movement on said table radially of the axis of said spindle comprising a cylindrical recess in said table, an elongated cylindrical guide sleeve fixed in said table within said recess and having its central axis precisely in alignment with the axis of said spindle, a locating pin having an elongated cylindrical portion slidably fitting closely within said guide sleeve, a tapered upper portion coaxial with said cylindrical portion and adapted to be projected above the surface of said table into engagement with holes in a template to be positioned on said table, and a rack section formed on said pin below said elongated cylindrical portion; and means for sliding said pin axially within said sleeve to project the tapered upper portion thereof above the surface of said table and retract it below said surface comprising a shaft rotatably mounted beneath said work table and having its axis normal to the axis of said pin, a pinion on said shaft meshing with the rack section of said pin, and a manually operable knob fixed to said shaft and disposed outwardly of the forward edge of said table.

References Cited in the file of this patent

UNITED STATES PATENTS

| | | |
|---|---|---|
| 1,679,506 | Storm | Aug. 7, 1928 |
| 1,817,400 | Snyder | Aug. 4, 1931 |
| 2,289,069 | Radermacher | July 7, 1942 |
| 2,461,579 | Thomas | Feb. 15, 1949 |

UNITED STATES PATENTS

| | | |
|---|---|---|
| 253,762 | Switzerland | Nov. 16, 1948 |